Figure 1:
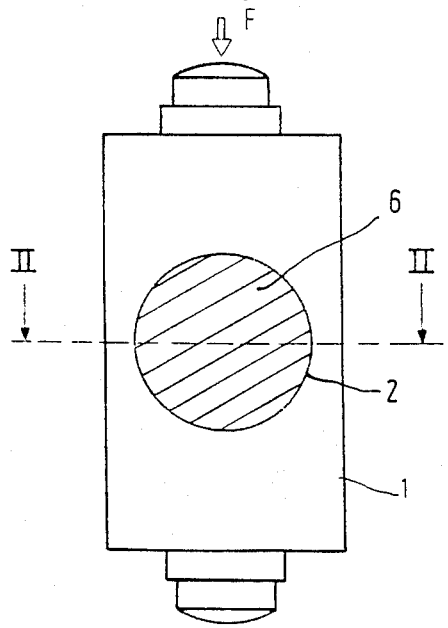

United States Patent [19]

Krause

[11] Patent Number: 4,858,710

[45] Date of Patent: Aug. 22, 1989

[54] LOAD CELL

[75] Inventor: Matthias R. Krause, Hamburg, Fed. Rep. of Germany

[73] Assignee: U.S. Philips Corporation, New York, N.Y.

[21] Appl. No.: 237,484

[22] Filed: Aug. 29, 1988

[30] Foreign Application Priority Data

Sep. 12, 1987 [DE] Fed. Rep. of Germany ....... 3730702

[51] Int. Cl.$^4$ .......................... G01G 3/14; G01L 1/22
[52] U.S. Cl. ................................... 177/211; 73/862.65
[58] Field of Search ....................... 177/211; 73/862.65

[56] References Cited

U.S. PATENT DOCUMENTS

| 3,376,537 | 4/1968 | Pugnaire | 177/211 X |
| 4,148,219 | 4/1979 | Golding et al. | 73/862.65 |
| 4,589,291 | 5/1986 | Sander | 73/862.65 |
| 4,733,571 | 3/1988 | Ormond | 73/862.65 |

Primary Examiner—George H. Miller, Jr.

[57] ABSTRACT

In a load cell, in particular for weighing systems, comprising a deformable member (1), this deformable member has an aperture (2) extending transversely of the direction of the force, which is closed by at least one disc-shaped wall which corresponds to the cross-section of the aperture and extends transversely of the axis of the aperture and serves to receive strain gauges which are deposited by means of a film technique. The deformable member is formed by two sub-members (3, 4) which are welded together in a plane which extends transversely of the axis of the aperture. A wall is provided in the aperture of each sub-member, at least one wall being provided at its interior side with strain gauges.

7 Claims, 1 Drawing Sheet

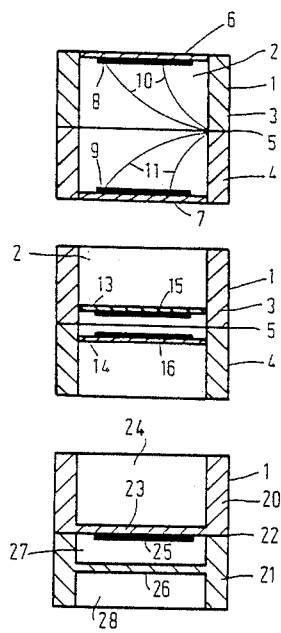

LOAD CELL

The invention relates to a load cell, in particular for weighing systems, comprising a deformable member which has an aperture extending transversely of the direction of the force, which is closed by at least one disc-shaped wall which corresponds to the cross-section of the aperture and extends transversely of the axis of the aperture and serves to receive the strain gauges which are deposited by means of a film technique.

Such a load cell for weighing systems is disclosed in the EP-PS 0 105 564. The prior art load cell has a cylindrical deformable member in the form of a compressively loaded member, in which a through-bore is provided transversely of the direction of the force. A disc-shaped wall which extends transversely of the axis of the bore is centrically welded in this bore. Strain gauges are deposited on the wall by means of a film technique. When a force acts in the direction transversely of the bore, the wall is compressed in the direction of the applied force and is expanded in a direction perpendicular to the force. This compression and expansion, respectively, causes the resistance of the strain gauges to change. Placing the disc-shaped wall in a central position in the bore is complicated as the welding spot within the bore is difficult to access. As the strain gauges which are deposited in film technique are sensitive to moisture, they must be protected from corrosion by covering them.

The invention has for its object to provide a load cell which renders easy mounting of the wall in the aperture possible and whose strain gauges are protected from corrosion without the need for further covering.

According to the invention, this object is accomplished with a load cell of the type defined in the opening paragraph in that the deformable member is formed from two welded together sub-members which extend in a plane transversely of the axis of the aperture and in that a wall which completely closes the aperture is provided in the aperture of each sub-member, at least one wall being provided with strain gauges at its interior side.

The load cell according to the invention consists of two sub-members which are connected together by welding. Each sub-member has an aperture in which a wall is provided which fully closes the aperture. Because of the smaller length of the aperture of a sub-member compared with the overall member easy mounting of the wall in the aperture is possible. The supports can easily be provided at the outer edge or at the inner edge of the aperture of a sub-member, respectively. The cross-section of such an aperture may be square, rectangular or circular. Since the strain gauges are provided at the interior side of a wall, i.e. at the side of the wall pointing towards the other sub-member, a corrosive substance cannot affect the strain gauges. The deformable member can be both a compressively loaded member or a shearing member (to take up shearing forces). A compressively loaded member can be constituted by, for example, a cube-shaped member or a cylindrical member. When the member is cylindrical and the walls are provided at the outer edge, the outer edge of the aperture at the exterior face of the member must be of such a shape that the edge curve of the aperture extends in a plane.

An easily produceable load cell is obtained when the aperture through the compressively loaded member is a circle cylindrical through-bore. In this situation the bore is either closed by two walls provided with strain gauges and welded to the exterior edge or by two of these walls welded to the interior side of the two sub-members. The two sub-members are then preferably of a symmetrical structure.

In a further embodiment of a load cell according to the invention the wall provided with the strain gauges is arranged in one sub-member at the interior edge and in the other sub-member the wall not provided with strain gauges is arranged inside the aperture. In this situation the walls may be separately welded-in discs. The walls may however alternatively be formed by milling out the aperture in a sub-member. To ensure that the wall without strain gauges does not contact the strain gauges of the other wall, the walls must be formed by milling both sides of the aperture. The apertures of each sub-member are preferably of a circle cylindrical shape.

An advantageous embodiment of the invention is obtained when the walls and the deformable member are made of the same material. This achieves that no measuring error occurs at a change in temperature. Since the walls and the deformable member are made of the same material they have namely also the same coefficients of expansion.

Figure 2:
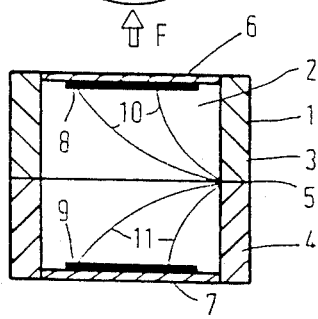
Figure 3:
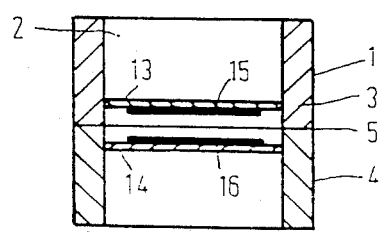
Figure 4:
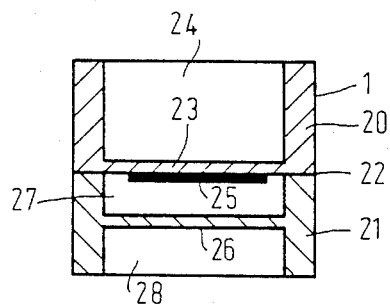

Embodiments of the invention will now be described in greater detail with reference to the accompanying drawing. Therein:

FIG. 1 is a side elevation of a compressively loaded member of a rectangular cross-section, FIG. 2 is a sectional view of a compressively loaded member in accordance with FIG. 1 taken on the plane II—II having walls provided at the outer edge of the through-aperture, FIG. 3 is a cross-sectional view of a compressively loaded member of FIG. 1 taken on the plane II—II having walls provided at the interior edge of the aperture and FIG. 4 is a cross-sectional view of a compressively loaded member of FIG. 1 taken on the plane II-II having a wall provided at the interior edge of the aperture of one sub-member and a wall provided in the aperture of the other sub-member.

FIG. 1 shows a load cell for a weighing system, having a cube-shaped compressively loaded member 1. The compressively loaded member 1 has an aperture 2 which is provided transversely of the longitudinal axis and is in the form of a circle cylindrical through-bore, as is shown in FIG. 2. The cube-shaped compressively loaded member 1 is formed by two symmetrically constructed sub-members 3 and 4, which are interconnected by a welded connection 5. The welded connection is located in a plane which extends transversely of the axis of the aperture. Welding must here be understood to mean an inseparable connection which is preferably made by fusion of the materials or by alloying at the connection points. The two sub-members can be connected to each other by microplasma welding, laser welding, electron beam welding or by hard soldering.

The aperture 2 is closed at both sides by a disc-shaped, metallic wall 6 and 7, respectively by means of welding. The surface or the walls 6 and 7 is basically equal to the cross-section of the through-bore 2. The welded joint interconnecting the disc-shaped walls 6 and 7 and an edge of the through-bore 2 extends along the overall periphery of the walls 6 and 7. The interior side of the walls 6 and 7 are provided with strain gauges 8 and 9, respectively in a thin-film technique, i.e. they are vacuum deposited or sputtered thereon. They may alternatively be deposited by means of a thick-film technique, the strain gauges then being printed and baked as a resistance paste on the walls 6 and 7 in a screen printing method. The strain gauges 8 and 9 are further connected to leads 10 and 11 which are fed out to the exterior through a channel in the compressively loaded member 1.

When a force F acts on the compressively loaded member 1, this member is compressed in the direction of the force F and bulges outwardly perpendicularly thereto. The change in shape of the compressively loaded member 1 results in the walls 6 and 7 being compressed in a direction parallel to the force F, and in an expansion of the walls 6 and 7 perpendicularly to the force F. The compression of the walls 6 and 7 reduces the resistance of the component parts of the respective strain gauges 8 and 9, which are deposited parallel to the direction of the force; the expansion of the respective walls 6 and 7 increases the resistance of the component parts of the respective strain gauges 8 and 9, which are deposited perpendicularly to the direction of the force F. By means of an evaluation circuit, not shown, the change in resistance of the strain gauges 8 and 9 is converted into an electric measuring signal which is proportional to the force F.

Placing the walls in the through-bore 2 may alternatively be effected in a different manner (FIG. 3). The aperture 2 is then closed at both ends by a disc-shaped metallic wall 13 and 14, respectively, by means of welding. In this situation the respective walls 13 and 14 are provided at the interior edge of the two sub-members 3 and 4, respectively. Strain gauges 15 and 16, respectively, are also provided on the interior side of the walls 13 and 14, respectively. The strain gauges are connected to leads, which are not further shown and are led out to the exterior via a channel in the compressively loaded member 1. The spacing between the two walls 13 and 14 must be chosen such that the strain gauges 15 and 16 and the leads can be accomodated in the intermediate space.

A further embodiment of the load cell is shown in FIG. 4. The cube-shaped compressively loaded member 1 is formed by two substantially symmetrically shaped sub-members 20 and 21, which are connected to each other by a welded joint 22 and which differ in the manner in which the walls 23 and 26 are provided. The sub-member 20 has at its interior side a wall 23 which is formed by milling a circle cylindrical hole 24 in the direction towards the welded joint 22. Strain gauges 25 are provided on the interior wall 23, which are further connected to electric leads, not further shown. The leads are each led to the exterior via a channel in the compressively loaded member 1. In the other sub-member 21 a wall 26 is also made by milling. Circle cylindrical holes 27 and 28 are then made at both sides of the sub-member 21. The hole 27 which points towards the interior of the sub-member 21 must be provided to ensure that the wall 26 and the strain gauges 25 do not contact each other.

In the load cell in accordance with FIG. 4, it is possible to first produce a through-bore in each sub-member 22 and 21, and to weld thereafter the metallic, disc-shaped walls 23 and 26 to the sub-members 20 and 21.

What is claimed is

1. A load cell, in particular for weighing systems, comprising a deformable member which has an aperture extending transversely of the direction of the force, which is closed by at least one disc-shaped wall which corresponds to the cross-section of the aperture and extends transversely of the axis of the aperture and serves to receive the strain gauges which are deposited by means of a film technique, characterized in that the deformable member (1) is formed from two welded-together sub-members (3, 4; 20, 21) which extend in a plane transversely of the axis of the aperture and in that a wall (6, 7; 13, 14; 23, 26) which completely closes the aperture (2; 24, 27, 28) is provided in the aperture of each sub-member, at least one wall being provided with strain gauges (8, 9; 15, 16; 25) at its interior side.

2. A load cell as claimed in claim 1, characterized in that the two sub-members (3, 4) are of a symmetrical construction.

3. A load cell as claimed in claim 1 or 2, characterized in that the aperture through the deformable member is a circle cylindrical through-bore (2) which is closed by two walls (13, 14) which are each welded to the interior edge of the two sub-members (3, 4) and are each provided with strain gauges (15, 16).

4. A load cell as claimed in claim 3, wherein the walls (6, 7; 12, 14; 23, 26) and the deformable member (1) are made of the same material.

5. A load cell as claimed in claim 1, characterized in that the wall (23) provided with the strain gauges (25) is arranged in one sub-member (20) at the interior edge and in the other sub-member (21) the wall (26) not provided with strain gauges is arranged inside the aperture (27, 28).

6. A load cell as claimed in claim 5, characterized in that the apertures (24, 27, 28) of each sub-member are of a circle cylindrical construction.

7. A load cell as claimed in any one of claims 1, 2, 5 or 6, characterized in that the walls (6, 7; 13, 14; 23, 26) and the deformable member (1) are made of the same material.

* * * * *